Sept. 28, 1954  H. P. LUHN  2,690,298
MULTIORDER IMPULSE COUNTER
Filed Dec. 9, 1952  9 Sheets-Sheet 1

INVENTOR
HANS P. LUHN
BY Harry T. Berriman
AGENT

Sept. 28, 1954 H. P. LUHN 2,690,298
MULTIORDER IMPULSE COUNTER
Filed Dec. 9, 1952 9 Sheets-Sheet 3

INVENTOR
HANS P. LUHN
BY
Harry T. Berriman
AGENT

Sept. 28, 1954          H. P. LUHN          2,690,298

MULTIORDER IMPULSE COUNTER

Filed Dec. 9, 1952                                9 Sheets-Sheet 4

INVENTOR
HANS P. LUHN
BY
*Harry T. Berriman*
AGENT

Sept. 28, 1954          H. P. LUHN          2,690,298

MULTIORDER IMPULSE COUNTER

Filed Dec. 9, 1952          9 Sheets-Sheet 6

INVENTOR
HANS P. LUHN
BY
AGENT

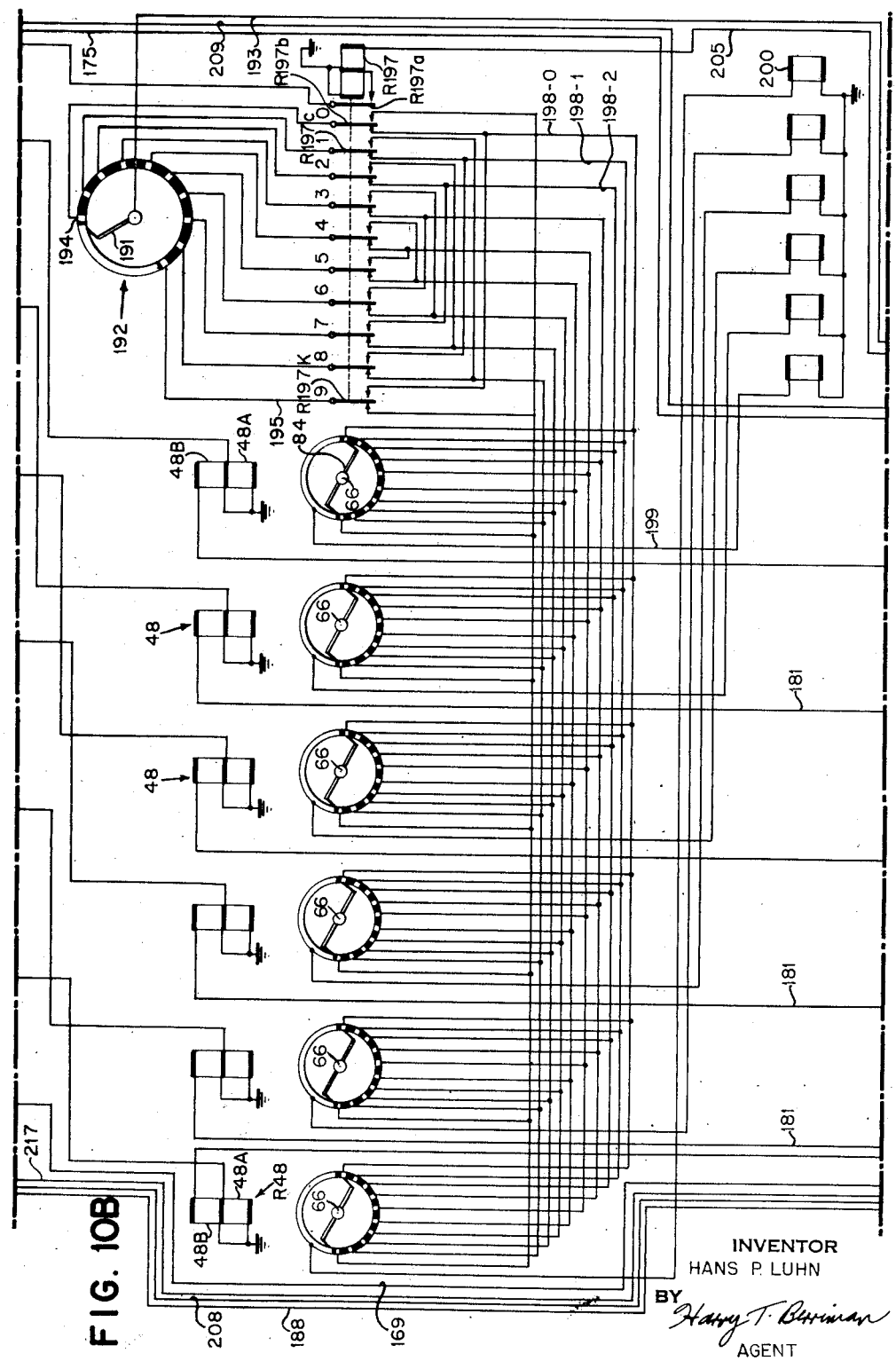

Sept. 28, 1954

H. P. LUHN 2,690,298

MULTIORDER IMPULSE COUNTER

Filed Dec. 9, 1952

READOUT EMITTER

INVENTOR
HANS P. LUHN
BY
*Harry T. Berrman*
AGENT

Patented Sept. 28, 1954

2,690,298

UNITED STATES PATENT OFFICE 2,690,298

MULTIORDER IMPULSE COUNTER

Hans P. Luhn, Armonk, N. Y., assignor to International Business Machines Corporation, New York, N. Y., a corporation of New York Application December 9, 1952, Serial No. 324,994

11 Claims. (Cl. 235—61.6)

This invention relates to electro-mechanical counting devices and more particularly to improvements in electrical impulse controlled counting devices of the power driven type.

A preferred embodiment of the invention may comprise a so-called contact plate formed of an insulating material and supported on a frame member by suitable spacers. Arranged between the frame and the insulating plate are a plurality of counters, each counter relating to a specific numeric order. Each counter includes two shafts which project through suitable openings in the insulating plate. Secured to each of the shafts for rotation therewith are two spring wipers or contactors, one bearing against the inner side of the plate and one bearing against the outer side of the plate. Embedded in the surfaces of the insulating plate around each of the shafts are groups of contact inserts, diametrically opposite pairs of inserts of each group being adapted for engagement by the related contactor dependent upon the angular displacement of the associated shaft. The contact inserts of each group are assigned a predetermined numerical significance and are electrically interconnected to the corresponding contact inserts of the other orders by circuitry also embedded in the insulating plate. In this manner, the majority of the required circuitry for a multi-order counting device is contained in the contact plate itself.

The shafts associated with each counter are displaced angularly in steps by operatively coupling them to continuously reciprocating driving means, this coupling action taking place by a novel electro-mechanical mechanism which itself is controlled by electrical read in pulses from any suitable source. The contactors associated with each shaft are "locked" thereto by a novel "floating" mechanism so that they are able to maintain positive contact with their related contact inserts under conditions of wear, flexure or warpage of the contact plate or wear of the contact inserts themselves. The net result of these various features is a compact multi-order counting device which is reliable in operation, simple in construction, small in size, and requires a minimum of circuitry external to the counter itself.

An object of the invention is to provide an improved counting device of the power driven and electrical impulse controlled type.

A further object of the invention is to provide a plural order counting device of unitary construction and small overall size.

A further object of the invention is to provide a plural order counting device having a noncon-ductive member in which are embedded groups of contact points and a majority of the required connecting circuitry for the device.

A further object of the invention is to provide a plural order counting device having simple and efficient driving means.

A further object of the invention is to provide a plural order counting device having a common insulating plate in which are embedded various groups of conductive contact points and allied circuitry and having novel floating wipers which are constructed so as to maintain positive contact with the desired contact points of the plate under conditions of wear, flexure, and warpage of the plate or wear of the contact points themselves.

Other objects of the invention will be pointed out in the following description and claims and illustrated in the accompanying drawings, which discloses, by way of example, the principle of the invention and the best mode, which has been contemplated, of applying that principle.

Figure 10A:
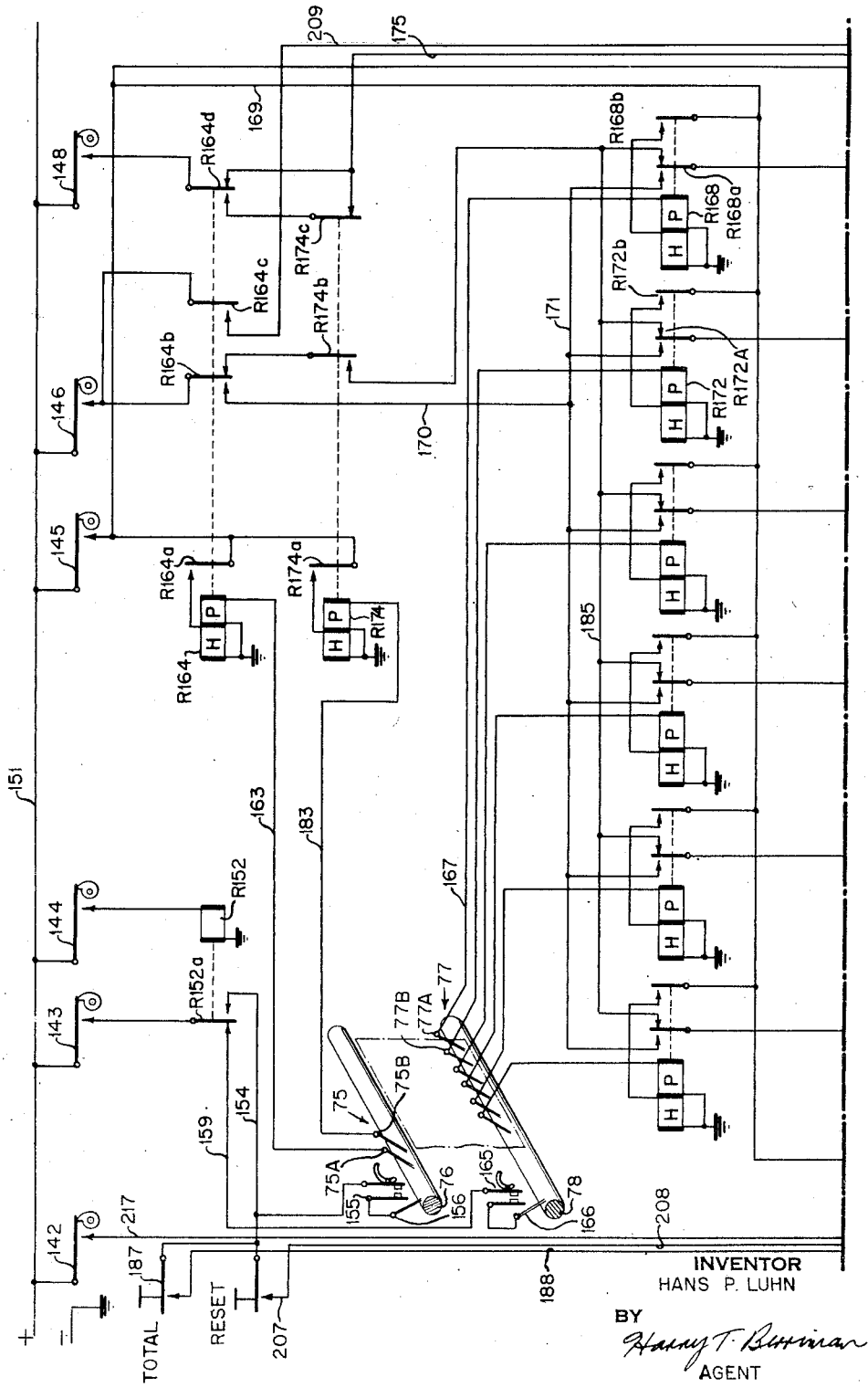
Figure 10C:
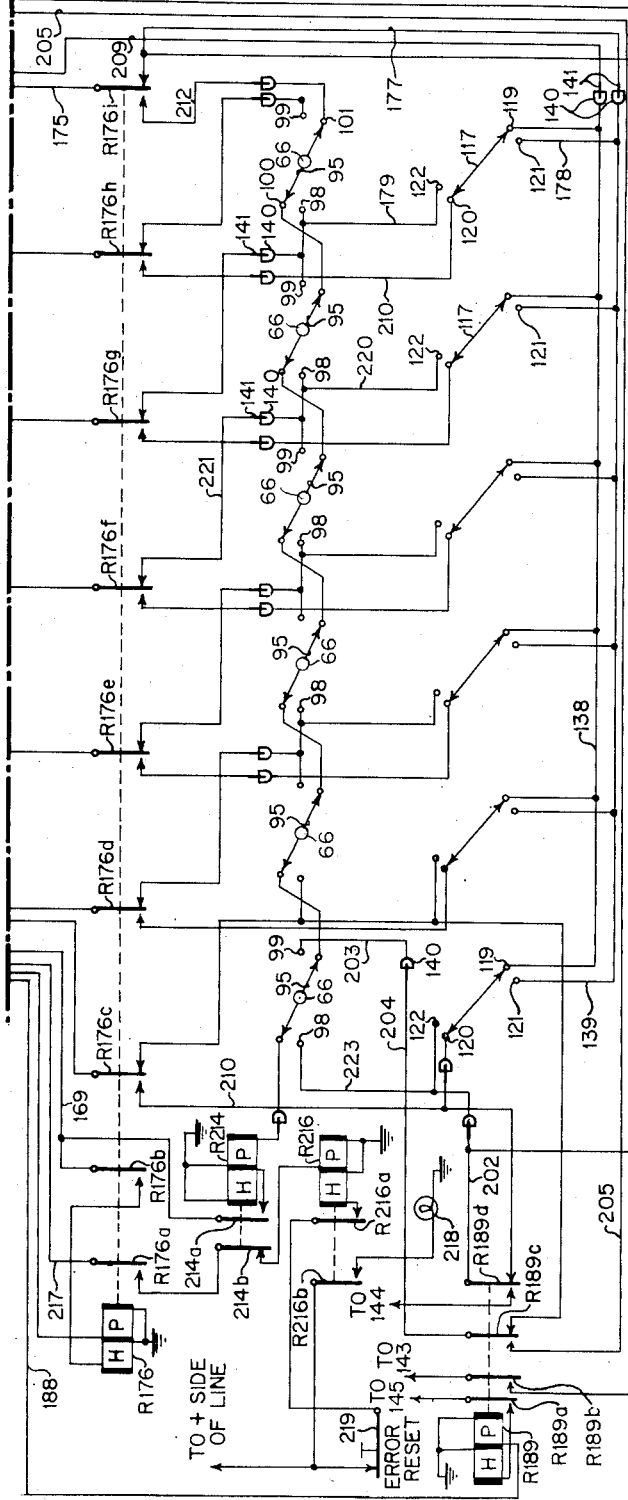

Figs. 10A, 10B, and 10C comprise a diagrammatic circuit representation of the six order counting device with necessary additional circuitry being indicated so as to achieve a complete six order accumulating machine.

Figure 11:
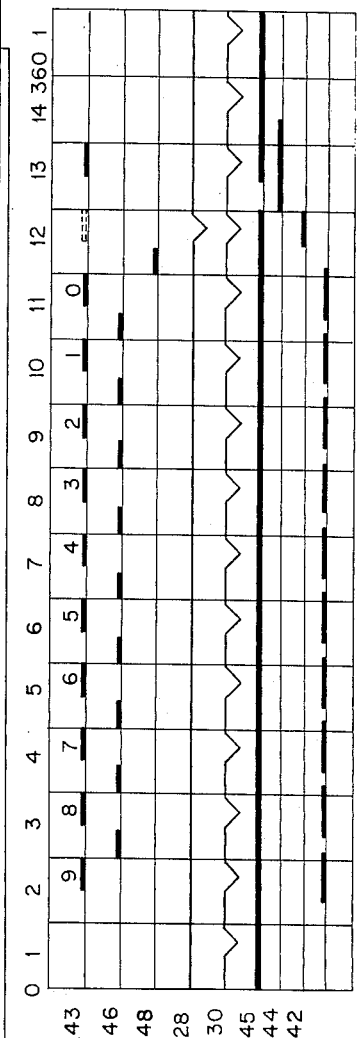

Fig. 11 is an electrical and mechanical timing chart of the six order accumulating machine.

Figure 1:
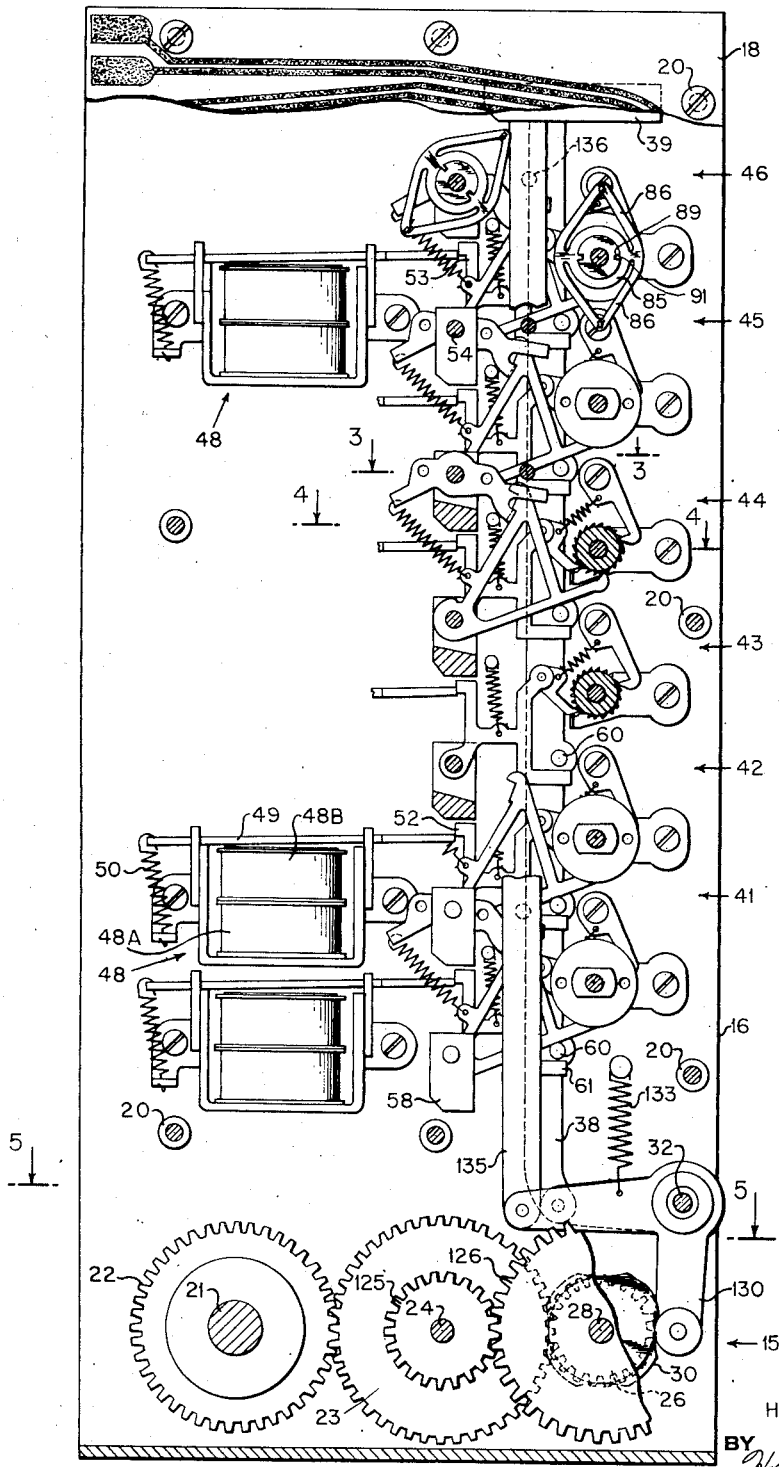
Fig. 1 is a front elevational view of a six order counting device with some parts being broken away or omitted completely to facilitate illustration.
Figure 7:
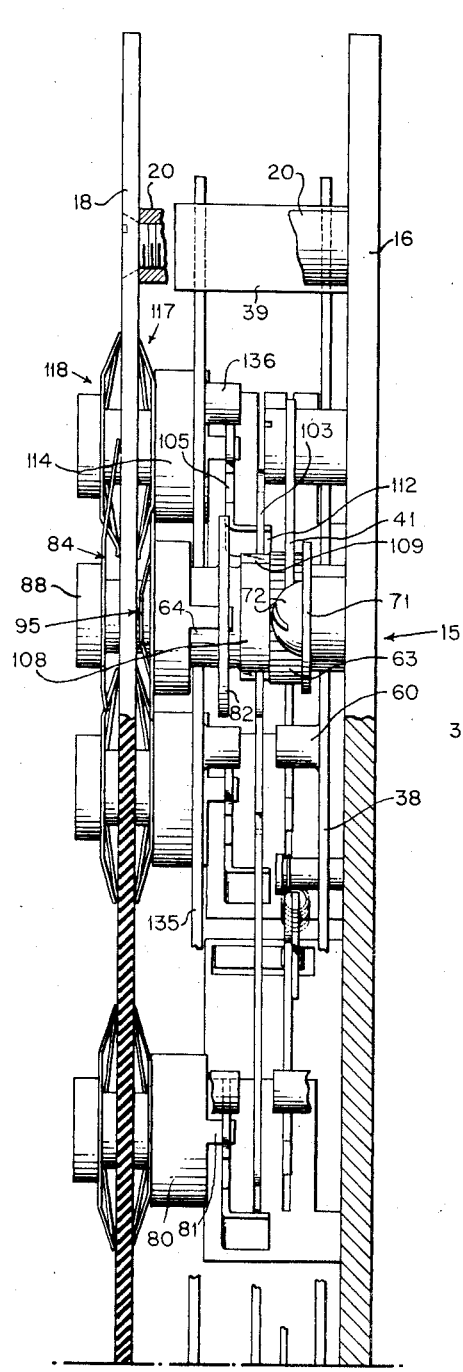
Fig. 7 is a right hand elevational view of the upper half of the mechanism shown in Fig. 1, with all omitted and broken away parts of Fig. 1 being restored.
Figure 6:
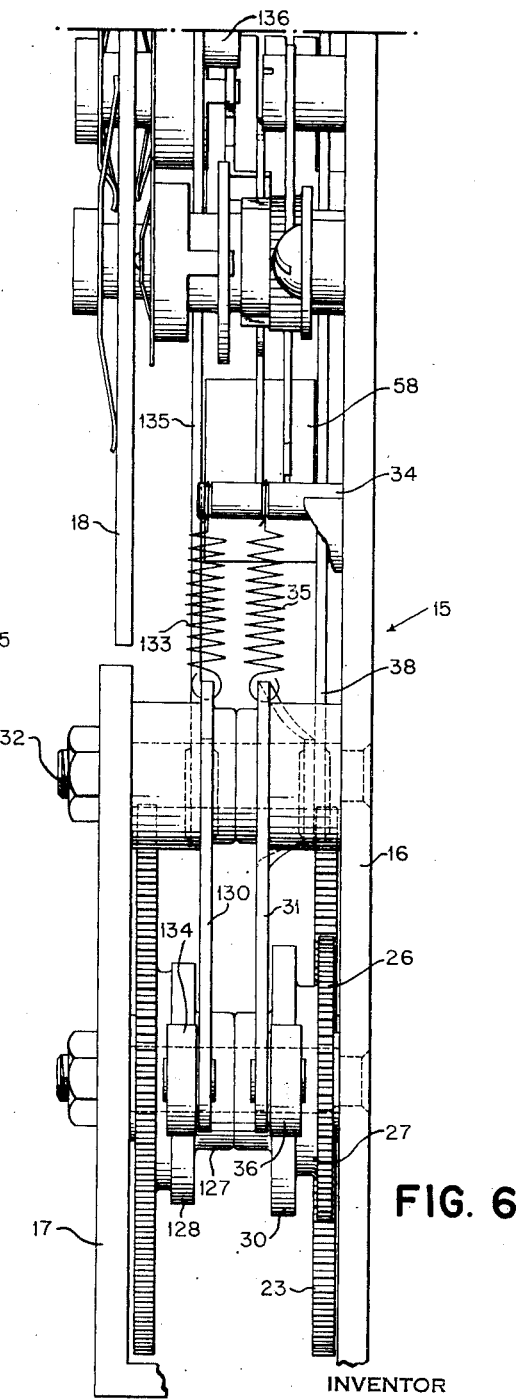
Fig. 6 is a right hand elevational view of the lower half of the mechanism shown in Fig. 1, with all omitted and broken away parts of Fig. 1 being restored.

Referring to Figs. 1, 6, and 7, the accumulating device comprises a rigid frame 15 having a main plate 16 and an integral extension 17 which is spaced from and projects parallel to the lower part of the main plate. A so-called contact plate 18 formed of an insulating material is supported parallel to the remaining part of the main plate 16 by means of spacers 20.

Arranged in the channel formed between the main plate 16 and the extension 17 of the frame is the drive mechanism for the accumulating device. The drive mechanism comprises a power shaft 21 which is journaled in the main plate 16 and the extension 17. The power shaft projects outwardly beyond the extension 17 and is operatively linked to any suitable driving source (not shown) so that the shaft is continuously rotated counterclockwise in Fig. 1. A gear 22 secured to the power shaft 21 drives a gear 23 and its associated shaft 24 which is journaled in the frame 15 in the same manner as shaft 21. The gear 23 in turn drives a gear 26 secured to a sleeve 27 (see Fig. 5) which is rotatably mounted on a shaft 28, the latter being secured to the frame 15.

Figure 2:
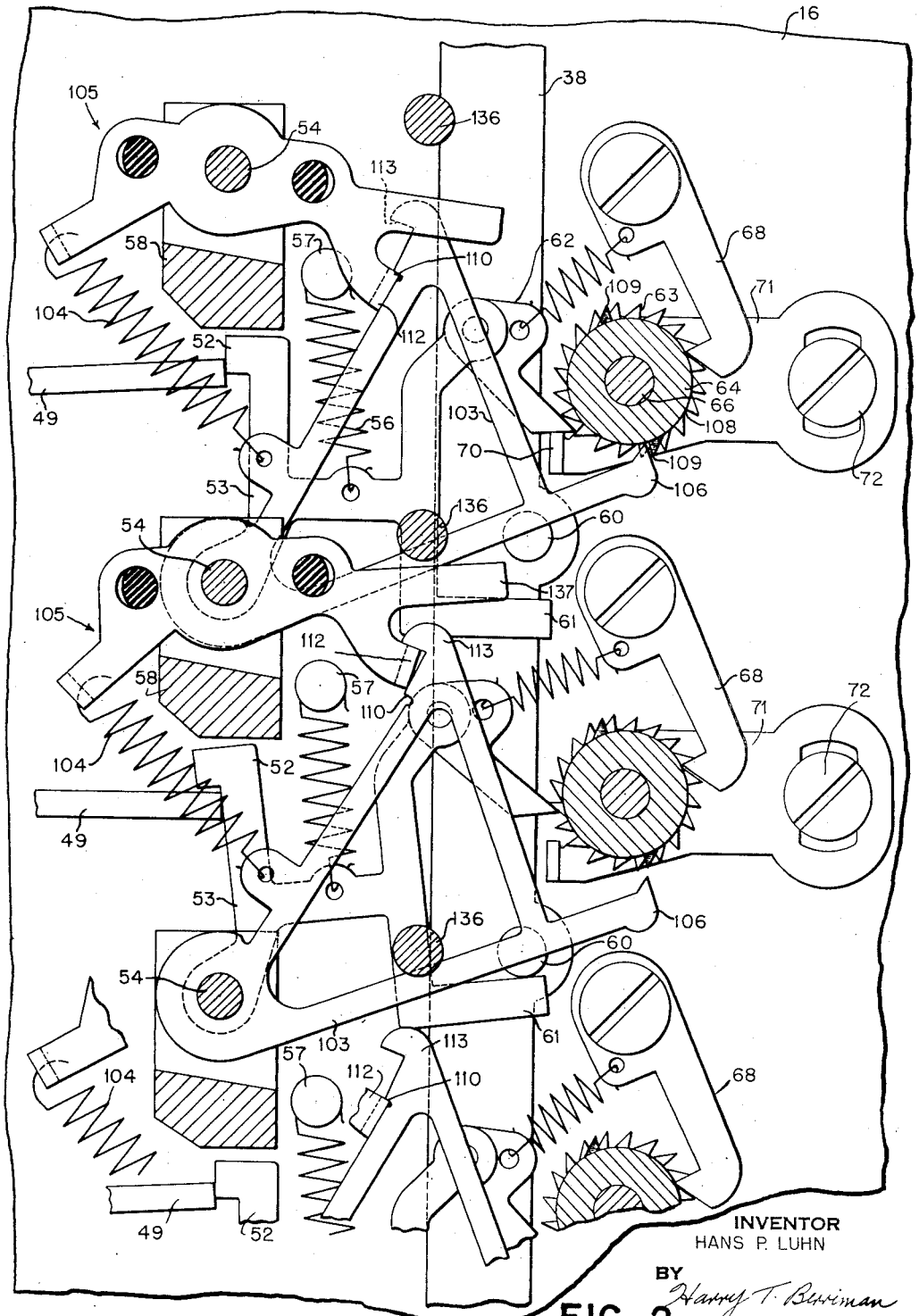
Fig. 2 is an enlarged vertical sectional view of part of the mechanism shown in Fig. 1.

Mounted for rotation with the sleeve 27 is a cam 30 having four lobes which act to rock a bellcrank follower 31 about a pivot shaft 32 carried by the frame. Connected between the follower 31 and a stud 34 secured to the main plate 16 is a spring 35 which biases the bellcrank follower so as to maintain a roller 36, carried by one arm of the bellcrank, in continuous engagement with the cam. Pivotally connected to the other arm of the bellcrank is a bar 38 which extends between the contact plate 18 and the main plate 16. The bar 38 is reciprocably guided at its upper end in a guide block 39 (Fig. 7) secured to the main plate 16. The accumulating device functions on a 14 point machine cycle as indicated in Fig. 11, and the bar is reciprocated vertically once during the latter part of each point of the machine cycle. The bar is shown in Figs. 1 and 2 in its normal or extreme upward position. With the exception of carry operations from one order of the accumulating device to a next higher order, the reciprocation of the bar 38 supplies the motive power for the entry of digital values into the counter.

The accumulating device includes six counting positions or orders ranging from a units counting position up to and including a hundred thousands counting position. The units order mechanism is generally designated 41 in Fig. 1, the tens order counting mechanism is generally designated 42, and the hundreds, thousands, ten thousands, and hundred thousands order positions are generally designated 43, 44, 45, and 46 respectively. Secured to the main plate 16 at each counting position is an electro-magnet 48 which controls the operation of that particular order counting mechanism. It will be noted that the magnet 48 includes two control coils 48A and 48B. An impulsing of either of these coils effects an energization of the magnet 48.

When the magnet 48 is unenergized, an associated armature 49 is biased by an armature return spring 50 so that it is positioned as indicated in Fig. 1, and as indicated for the upper counting mechanism in Fig. 2. With the armature in this particular position, its end is adapted to engage an arm 52 of a related lever 53 for holding the latter against rotation in a counterclockwise direction around its pivot shaft 54. A spring 56 connected between the lever 53 and a spring stud 57 carried by the main plate 16 continually biases the lever in a counterclockwise direction in Fig. 2. It will be noted in Figs. 2, 3, and 4 that each pivot shaft 54 is carried by a multi-slotted block 58 which is secured to the main plate 16. The lever 53 is guided in one of the slots of the block so that lateral movement of the lever is prevented.

Projecting laterally from the bar 38 at each counting position is a pin 60. Each of the pins 60 projects above an extending arm 61 of the related lever 53. When a lever 53 is latched by an armature 49 and the bar occupies its extreme upward position as in Fig. 2, there is a clearance between the arm 61 and its associated pin 60. With the lever latched, the arm is contacted by the corresponding pin 60 only when the bar 38 is in its lowest position. Thus the reciprocation of the bar 38 has no effect on a lever 53 as long as its associated magnet remains unenergized.

Pivotally mounted on each lever 53 is a pawl 62 which is adapted for cooperation with a related ratchet wheel 63. The ratchet wheel is secured to a collar 64 (Fig. 4) which is rotatably mounted on a shaft 66 carried by the plate 16. With the lever 53 in its latched position, the related pawl 62 is positioned relative to the corresponding ratchet wheel as indicated in the upper part of Fig. 2. As will be later evident, a magnet 48 may be impulsed only when the bar 38 occupies its extreme upward position. Consequently, upon the energization of a magnet 48, the movement of its armature 49 unlatches the related lever 53 which is then urged clockwise in Fig. 2 until its arm 61 engages the related pin 60 on the bar. The lower lever 53 in Fig. 2 is shown in this latter position. As a lever 53 assumes this position, the associated pawl 62 ratchets over one tooth of the ratchet wheel 63 and assumes the position indicated. A spring biased detent pawl 69 cooperates with the related wheel 63 to prevent clockwise rotation of the wheel. Thereafter as the bar 38 moves downward, the unlatched lever 53 is rotated clockwise in Fig. 2.

As the lever 53 rotates, the pawl 62 rotates the wheel 63 counterclockwise around its shaft 66 until the nose of the pawl engages a stop portion 70 of a member 71. One end of the member 71 is pivotally mounted on the shaft 66, while the other end is slotted as indicated. A screw 72 threaded into a stud 73 on the main plate 16, extends through the slotted end of the member 71 and normally locks the member securely to the frame 15. By loosening the screw 72, the member 71 may be displaced on the shaft 66 to effect an adjustment of the stop portion 70 relative to the related pawl 62. By proper adjustment of the member 71, the "throw" of the related pawl 62 on a downward movement of the bar 38 is accurately limited to effect an exact single tooth advance of the wheel 63. As the bar 38 restores upwardly to its normal position, each unlatched lever 53 is relatched by the armature 49 of the related control magnet 48 which is unenergized at that particular time. It will be appreciated that by successively impulsing a control magnet 48, each downward movement of the bar 38 effects a single tooth advance of the related wheel 63.

Each ratchet wheel 63 operates to count in values represented by holes at card index points in a corresponding column of successive record cards. The record cards utilized may be conventional IBM cards having 80 parallel columns of perforation receiving areas with 12 index points per column. The index points are designated 9, 8, 7, 6, 5, 4, 3, 2, 1, 0, 11, and 12, the index points 9 to 0 being defined as the numeric index points, and the 11 and 12 index points being defined as the control index points. A number is represented in any particular column of the record by punching a hole in that column at the desired numeric index point.

Entry of numeric data into the accumulating device is effected by advancing the record 9's edge first between a line of sensing brushes 75 (Fig. 10A) and a rotatably mounted contact roll 76, and thereafter between a line of sensing brushes 77 and a rotatably mounted contact roll 78. As the record is advanced between the brushes 75 and the roll 76, the 11 and 12 control index point positions of the record are sensed. As a result of the sensing of the control index points of the card, various circuits are activated in a manner to be explained for controlling the operation of the accumulating device. Thereafter as the record moves between the brushes 77 and the contact roll 78, the numeric index points 9 to 0 are sensed thus effecting the actual entry of the punched numeric data into the accumulating device. The contact rolls 76 and 78 are spaced apart a distance equal to one complete machine cycle of 14 index points. This is a distance slightly larger than the width of the record cards utilized. Thus the control operations determined by the punching at the 11 and 12 index points of a record card are set up during the latter part of the cycle preceding the cycle during which the numeric index points of that card are sensed.

The record cards are advanced past the brushes 75 and 77 by means of conventional mechanism (not shown) which is operatively linked with and timed to the power shaft 21. The record advancing mechanism is so timed that the index points of each record are sensed during a specific index point of the machine cycle as indicated in Fig. 11. When a numeric hole in a record card is sensed as the record moves between the brushes 77 and the roller 78, a circuit is completed through the hole on the card to effect an energization of the corresponding magnet 48 at that point in the machine cycle and at each of the remaining numeric index points to be sensed. The manner in which this action is effected will be described later in connection with the circuit description. Since the magnet 48 is pulsed for each index point of the record from the hole sensed until the "0" index point position of the record moves past the sensing brushes 77, then the corresponding lever 53 is rocked by the reciprocation of the bar 38 to advance the related ratchet wheel 63 counterclockwise a number of teeth equal in number to the number of value of the hole in the record.

Figure 3:
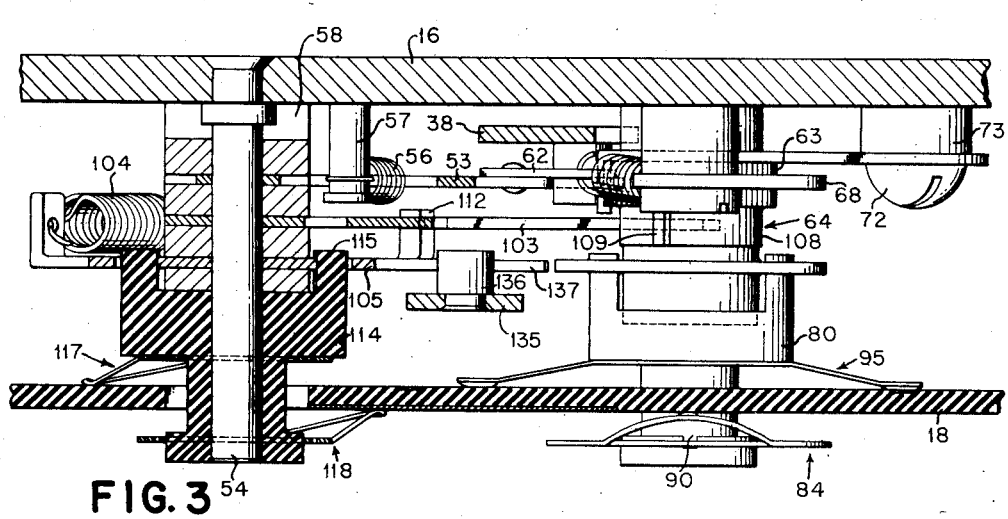
Fig. 3 is an enlarged horizontal sectional view taken on the plane of the line 3—3 of Fig. 1, with all omitted and broken away parts of Fig. 1 being restored.
Figure 4:
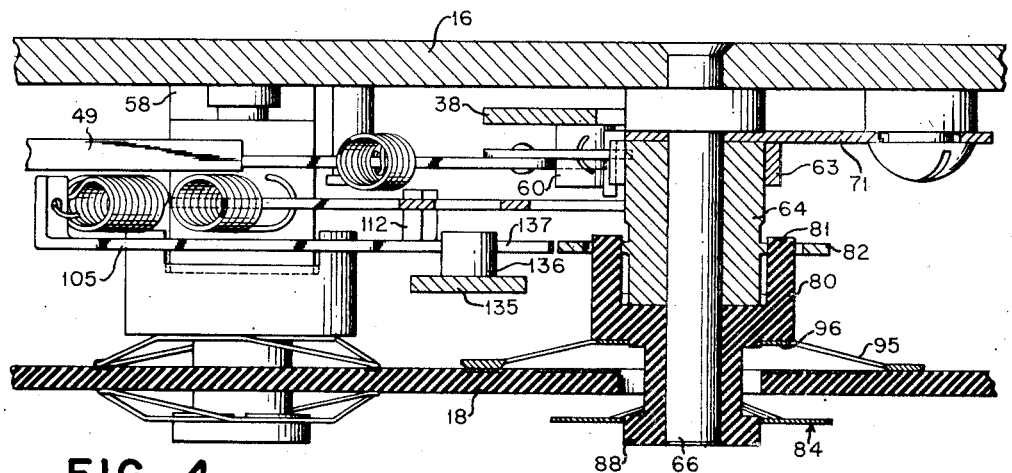
Fig. 4 is a horizontal sectional view taken on the plane of the line 4—4 of Fig. 1, with all omitted and broken away parts of Fig. 1 being restored.

Referring to Figs. 3, 4 and 7, it will be noted that rotatably mounted on the other end of each shaft 68 is a bushing like member 80 formed of an insulating material. The bushing includes integral extending fingers 81 which are adapted to engage suitable openings in a disc like extension 82 of the collar 64. As a result of this construction, the bushing is linked to and adapted for rotation with the collar 64 and its associated ratchet wheel 63. The bushing extends through an aligned clearance opening in the contact plate 18 and projects beyond the plate as indicated in Figs. 4 and 7. "Locked" to the outer end of the bushing for rotation therewith is a spring contactor 84.

The contactor 84 comprises a rigid ring portion 85 (Fig. 1) and two extending flexible contact portions 86 which are adapted to bear against the contact plate 18. It will be noted that the contact portions 86 extend diametrically opposite to each other. Each spring contactor is "locked" to its related bushing 80 by means of the following construction: Referring to Figs. 1 and 4, it will be noted that the outer end of each bushing 80 comprises a flanged portion 88 which has a pair of slots 89 cut completely therethrough at diametrically opposite points. The flange also includes a pair of recesses 90 cut in its inner face as indicated in Fig. 3, the recesses being positioned diametrically opposite to each other. Each recess 90 is spaced 90 degrees circumferentially from the adjacent slots 89. Projecting inwardly from diametrically opposite points at the inner edge of the ring portion 85 of the spring contactor are integral tabs 91. The ring portion 85 itself has an inside diameter slightly larger than the outside diameter of the flange 88 of the bushing 80. The contactor is secured to the bushing by first aligning the tabs 91 with the slots 89. The contactor is then pressed toward the plate until the tabs 91 are beyond the inner surface of the flange 88. Thereafter the contactor is rotated 90 degrees until the tabs are aligned with the recesses 90. The contactor is then released and the flexible contact portions 86 acting against the plate 18 force the tabs into the recesses 90, thus locking the contactor to the bushing.

Figure 8:
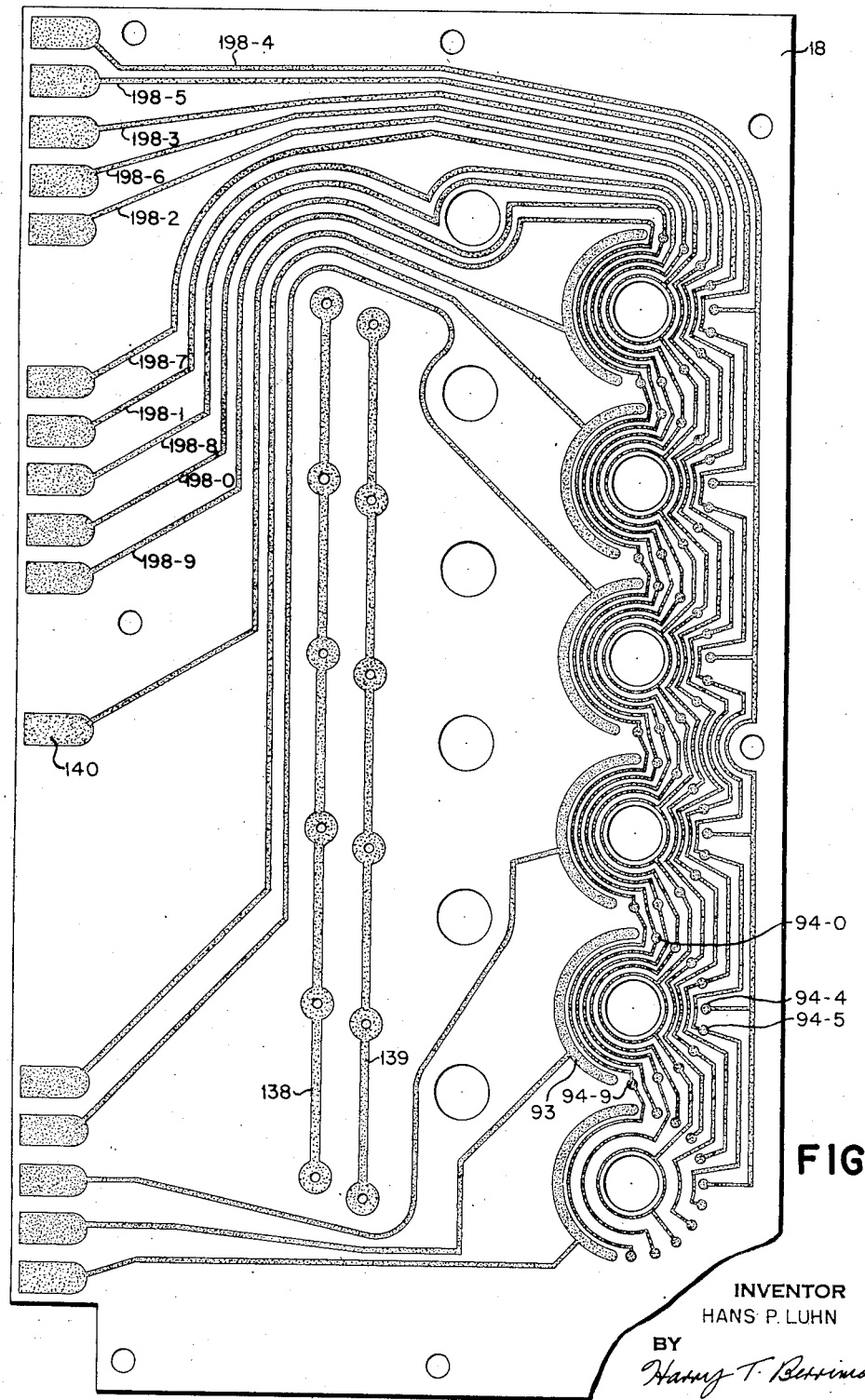
Fig. 8 is a front elevational view of the common contact plate of the six order counting device.

The spring contactor associated with each bushing is adapted to connect a related common contact member 93 (Fig. 8) with any one of ten different contact inserts 94, the contact member and contact inserts being imbedded in the contact plate 18 as best indicated in Fig. 8. Each of the ten inserts 94 is indicative of one of the numerals 0 to 9, and, as indicated in Fig. 8, is electrically commoned to the corresponding contacts of the other orders by suitable circuitry imbedded in the contact plate.

Figure 9:
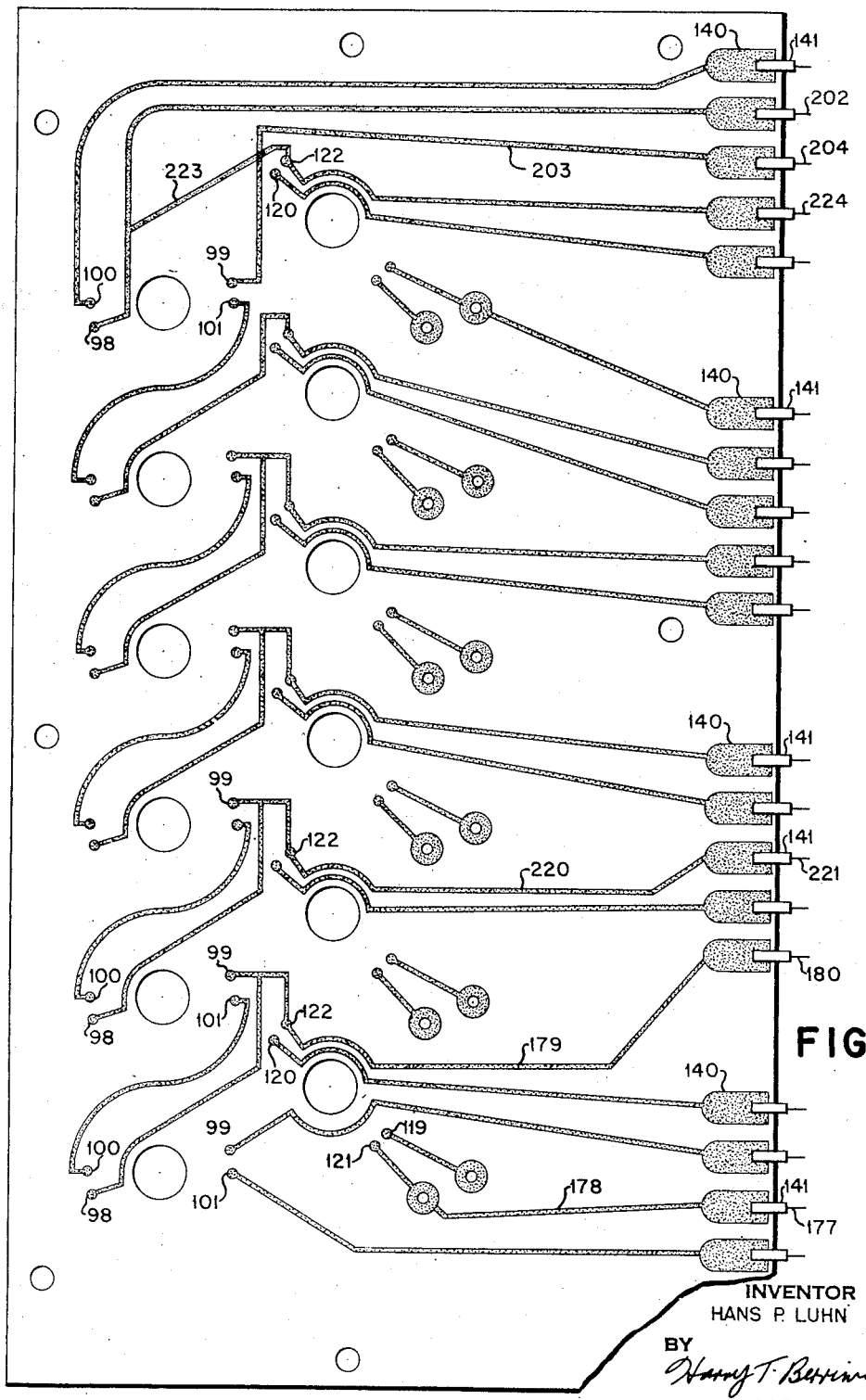
Fig. 9 is a rear elevational view of the common contact plate of the six order counting device.

A spring contactor 95, identical to contactor 84 is also secured to each bushing 80 and is adapted to bear against the inner side of the contact plate 18 as best indicated in Figs. 3, 4, and 7. The contactor 95 is locked to the bushing by the engagement of tabs, similar to the tabs 91 of the contactor 84, with matching slots in a shouldered portion 96 of the bushing. The contactor 95 is displaced 90 degrees on the bushing 80 from the contactor 84 and as a result, the contact portions 86 of the contactor 84 and the contact portions of the contactor 95 engage the plate 18 at 4 equally spaced points. Imbedded in the inner side of the contact plate at each counter position, as shown in Fig. 9, are diametrically opposite contact points 98 and 99, and diametrically opposite contact points 100 and 101. The contactor 95 is adapted to connect contact points 98 and 99 when the related contactor 84 is connecting the common contact 93 with the contact insert 94 representative of the numeral 9. Similarly the contactor 95 connects the contact points 100 and 101 when the related contactor 84 is connecting the common contact 93 with the contact insert 94 representative of the numeral 0.

It will be noted in Fig. 4 that the fingers 81 are slightly smaller than their mating openings in the disc extension 82 so that the bushing 80 actually "floats" on the shaft 66. As a result of this floating mounting, the contactors 84 and 95 are free to adjust themselves to any warpage or bending of the contact plate 18, thus insuring that positive contact is always maintained between each contactor and its respective side of the plate.

A carry operation from one order or position of the counter to the next higher order is effected by means of the following construction. At each counting position is a carry lever 103 pivotally mounted on the shaft 54 and guided in one of the slots of the block 58. The carry lever is continually biased counterclockwise in Fig. 2 by a spring 104 connected between the lever and a member 105, the latter being rotatably mounted on the shaft 54 at the next higher counting position and guided in a slot of the associated block 58. As a result, a follower arm 106 of the carry lever 103 normally bears against a cam portion 108 of the related collar 64 as shown in the upper part of Fig. 2. Formed on this portion of the collar are two lobes 109, one for each ten teeth of the associated ratchet wheel 63. As one of the lobes 109 comes under the arm 106, the lever 103 is rocked counterclockwise in Fig. 2 to disengage an integral shoulder 110 from an arm 112 of the previously mentioned member 105. As a result, the member 105 is swung counterclockwise around its pivot 54 by the spring 104 until the arm 112 engages a second shoulder 113 of the carry lever 103 as shown in the lower part of Fig. 2. The lobes 109 of the cam portion 108 and the associated spring contactor 84 are so positioned relative to each other on the shaft 66 that when the contactor connects the common contact 93 to the "0" contact 94, one of the lobes 109 is engaging the arm 106.

Referring to Figs. 3 and 4, it will be noted that a bushing 114 formed of an insulating material is rotatably mounted on each of the shafts 54. This bushing is locked to the adjacent member 105 for movement therewith by the engagement of integral extending fingers 115 with mating openings in the member 105. The bushing 114 extends through an aligned clearance opening in the plate and projects beyond the plate as indicated. In a manner identical to the manner by which the previously mentioned contactors 84 and 95 are locked to the bushing 80, contactors 117 and 118 are locked to the bushing 114. The extending fingers 115 of the bushing are slightly smaller than the mating openings in the member 105 so that the bushing 114 "floats" on the shaft 54 in the same manner as the bushing 80 "floats" on the shaft 66. The contactor 117 which bears against the inner side of the contact plate 18 is adapted to normally connect so associated contact point 119 imbedded therein with a similarly imbedded contact point 120. The contactor 117 is positioned on the bushing 114 relative to the member 105 so that the contact 119 is connected to the contact 120 when the member 105 is latched on the shoulder 110 of the carry lever 103. However, when the member 105 is displaced so that the arm 112 engages the shoulder 113 which results from the related wheel 63 being advanced through its 0 position as previously explained, the contactor 117 is adapted to interconnect contact points 121 and 122 also imbedded in the contact plate 18. With the contact point 121 connected to the contact point 122, a circuit is completed therethrough during the 12th cycle point of the machine cycle in a manner to be later explained. The completion of this circuit effects an impulsing of the magnet 48 of the next higher order counter thus adding a carry or a one into that position. The contactor 118 is displaced 90 degrees on shaft 54 from the contactor 117 and bears against the outer surface of the contact plate 18. The contactor 118 serves only to complete the mechanical assembly and has no electrical function.

Figure 5:
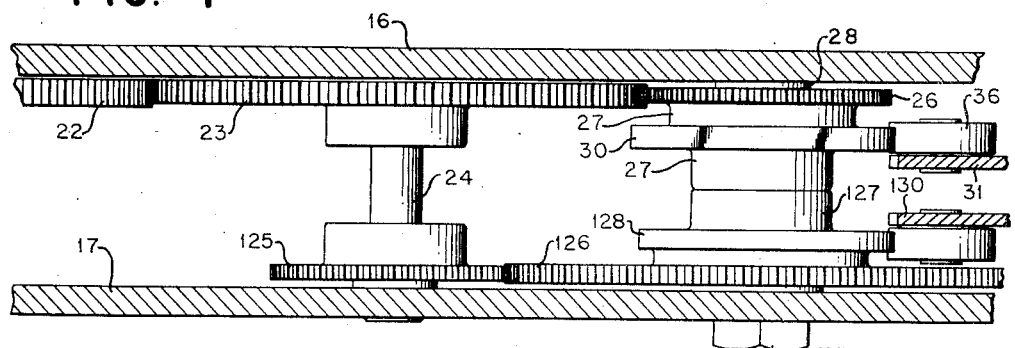
Fig. 5 is a horizontal sectional view taken on the plane of the line 5—5 of Fig. 1, with all omitted and broken away parts of Fig. 1 being restored.

After the carry operation is completed, the member 105 is rocked clockwise from its carry position in Fig. 2 to relatch the arm 112 on the shoulder 110. The member 105 is restored by the following mechanism. Referring to Figs. 1 and 5, it will be noted that secured to the previously mentioned continuously driven shaft 24 is a second gear 125. The gear 125 is adapted to drive a gear 126 secured to a second sleeve 127 which is mounted on the shaft 28. Mounted for rotation with the gear 126 is a cam 128 having a single lobe which acts to rock a related bellcrank follower 130 about the previously mentioned shaft 32. A spring 133 connected between the follower 130 and the spring stud 34 biases the follower so as to maintain its roller 134 continually in contact with the cam 128. Pivotally connected to the follower 130 is a bar 135 which extends between the contact plate 18 and the frame 15, as indicated, and is reciprocably guided at its upper end in the previously mentioned guide block 39. Referring to Fig. 11, it will be noted that the cam 128 is adapted to reciprocate the bar 135 once during each machine cycle. The bar is reciprocated shortly after the completion of the carry operation during the 12th cycle point of the machine cycle.

Projecting laterally from the bar 135 at each counting position is a pin 136. If a member 105 is positioned with its arm 112 engaging the shoulder 113 of the related carry lever 103, as a result of a carry operation, the bar 135, as it starts to move downward during the 12th cycle point of the machine cycle, engages one of its pins 136 with an arm 137 of the member 105. Further downward movement of the bar rocks the member 105 counterclockwise in Fig. 2 until the arm 112 is relatched on the shoulder 110.

*Circuits*

Referring to Figs. 10A, 10B, and 10C, there is shown in diagrammatic form a circuit for controlling the operation of the accumulating device and for effecting readout therefrom to conventional electro-magnet controlled print devices. As previously explained, a great deal of the required circuitry for the device is provided by the embedded circuitry on the contact plate 18, as will be evident from a comparison of the circuit diagram with the plate. The circuitry on one side of the plate is electrically distinct from the circuitry on the other side of the contact plate except for the contact points 119 and 121. The contact point 119 at each counting position is electrically connected to an imbedded common circuit conductor 138 on the other side of the plate 18 by a suitable conductive eyelet (not shown) which extends through the plate. In a similar manner, the contact point 121 at each counting position is electrically connected to a common conductor 139 on the other side of the plate. It will be noted in Figs. 8 and 9 that the various circuits on the plate 18 terminate at one edge thereof in enlarged contact areas 140. Individual spring contacts 141 engage these areas and connect them to the circuitry external to the contact plate.

Each of the contacts 142, 143, 144, 145, 146, and 148 shown in Fig. 10A are closed during specific intervals of the machine cycle, as indicated in Fig. 11, by a related cam which is operatively connected to and timed with the power shaft 21 by suitable mechanism (not shown). The purpose of each of the contacts 142 to 148 will be later evident.

It is believed that an understanding of the operation of the accumulating device and the associated circuit will be facilitated by reviewing a representative accumulate operation. Assume that a first record is perforated representative of the number +48, and a second record is perforated representative of the number +36, it being desired to accumulate these two numbers to achieve a total of 84. The two records will, of course, be perforated in corresponding columns. It is also necessary that each of the records be perforated in the 12 index position of the column of the record which will be sensed by the brush 75A of the control brushes 75. This brush may be arranged in alignment with any card column. The perforation in the 12 index point position in this column indicates that the number represented in the record is a positive number.

Referring to Figs. 10A and 11, it will be noted that the cam contact 144 is closed from the beginning of the thirteenth cycle point of each machine cycle until about the midpoint of the fourteenth cycle point. As a result, there is a circuit available during this interval from the power line 151 through cam actuated contact 144 and a relay R152 to ground. The energization of the relay R152 effects a transfer of the associated contacts R152a which sets up a circuit from the cam contact 143, through the normally open side of contacts R152a, now closed, a conductor 154, a card lever contact 155, which is closed by the passage of the first record card between the contact roller 76 and the brushes 75, and finally to a common brush 156 which continually engages the contact roller 76. During the latter part of the thirteenth interval of the machine cycle, the closing of cam contact 143 completes a circuit from the power line 151, through the precompleted circuit traced above to the common brush 156. At this particular time, the 12 index point perforation of the first record (that punched for the number 48) is being sensed by the 75A brush so that a circuit is completed from the power line 151 through the circuit previously traced to the brush 156, then through the 75A brush, a conductor 163 and the pick-up coil of an add control relay R164 to ground. The energization of the relay R164 causes its normally open contacts R164a to close, its contacts R164b to transfer, its normally open contacts R164c to close, and its contacts R164d to transfer. The closing of the contacts R164a completes a circuit from the power line 151 through cam contact 145, now closed, and through the hold coil of the add relay R164 to ground. Relay R164 is held energized through cam contact 145 until the end of the twelve index point of the next machine cycle. After the add relay is energized as a result of the sensing of the twelve hole in the first record card, the record moves out of engagement with the roller 76 and into engagement with the roller 78.

As the first record card advances between the contact roller 78 and the line of brushes 77 during the second machine cycle, the following action takes place. It will be remembered that this record is perforated to represent the numeral 48.

The record advances between the roller and the brushes 9's edge first as previously explained. As the 8 index position of the record is sensed by the units brush 77A of the brushes 77 during the latter part of the third cycle point of the machine cycle, a circuit is completed from the power line 151 through the cam contact 143, now closed, the normally closed side of the contacts R152a which are closed at this time as relay R152 is unenergized through a conductor 159, a card lever contact 165, now closed by the record, a common brush 166 which engages the contact roll 78, the units brush 77A of the brushes 77, which is now engaging the contact roll through the perforation in the 8 index point position of that column of the record card, through the conductor 167 and the pick up coil of the units entry relay R168 to ground. The energization of the relay R168 causes its associated contacts R168a to transfer and its normally open contacts R168b to close. The closing of the contacts R168b completes a hold circuit for the relay R168 from the power line 151, through cam contact 145, now closed (see Fig. 11), conductor 169, the contacts R168b and the hold coil of relay R168 to ground. Relay R168 is held energized until cam contact 145 opens at the end of the twelfth cycle point of this machine cycle.

During the machine interval when the relay R168 is energized and its contacts R168a are transferred, counter entry pulses from cam contact 146 are delivered from the power line 151, through cam contact 146, the normally open side of contacts R164b, now closed, the conductor 170, the conductor 171, the normally open side of contacts R168a, now closed, and through the coil 48A of control magnet 48 in the units order counter to ground. It will be evident from an examination of the timing chart in Fig. 11 that, as a result of the sensing of the perforation in the 8 index point of the record, the related units control magnet 48 is pulsed 8 times. Thus the associated ratchet wheel 63 is advanced 8 teeth in the manner previously explained. At the end of this eight tooth advance of the units ratchet, the associated contactor 84 is connecting the common contact insert 93 to the "8" insert 94 which signifies that the numeral 8 is now standing in the units order counter.

In a corresponding manner, the sensing of the "4" perforation by the tens brush 77B of the brushes 77 effects the energization of a related tens entry relay R172 during the latter part of the seventh cycle point of the same cycle. The tens entry relay is held energized through its own normally open contacts R172b and cam contact 145. With the tens entry relay energized, four counter entry pulses are delivered from cam contact 146 through the normally open side of the contacts R172a, now closed, to the control magnet 48 of the tens order counter. As a result of these four entry pulses, the tens order ratchet wheel 63 is advanced four teeth in the manner previously explained. At the end of this four tooth advance of the tens order ratchet, the associated contactor 84 is connecting the common insert 93 to the "4" insert 94 which signifies that the numeral 4 is now standing in the tens order counter.

During the second machine cycle when the numeric index points of the first record are being sensed by the brushes 77, the second record is passing between the brushes 75 and the contact roller 76. At the end of the twelfth cycle point of this machine cycle, the cam contact 145 opens thus deenergizing the add entry relay R164, the units entry control relay R168, and the tens entry control relay R172, in the manner previously explained. However, during the following or thirteenth cycle point, the twelve index point of the second record card is sensed and since this is an "add" record, the sensing of the twelve hole by the brush 75A completes a circuit to again energize the add magnet R164. As before, the add magnet is held energized through its own contacts 164a and cam contact 145 until the end of the twelfth cycle point of the next or third machine cycle.

During the third machine cycle, the numeric index points of the second record are sensed. It will be remembered that this record is perforated to represent the numeral 36. The sensing of the "6" hole in the units column of the record effects a 6 tooth advance of the units order ratchet wheel in the manner previously explained. Thus, the related contactor 84, which it will be remembered was engaging the "8" insert as a result of the entry of an "8" during the previous cycle, is advanced six more positions from the 8 position. Thus the contactor is advanced from the 8 position, through the 0 position, and finally into the position where the contactor is connecting the common insert 93 to the "4" insert 94. This indicates that the numeral 4 is now standing in the units counter. As the contactor 84 advances through the "0" position, a lobe 109 of the cam portion 108 of the associated collar 64 engages the follower arm 106 of the related carry lever 103. As a result, the carry lever is rocked counterclockwise in Fig. 2 as previously explained thus disengaging its shoulder 110 from the arm 112 of the associated carry member 105. The carry member 105 then swings counterclockwise around pivot 54 under the urging of spring 104 until the arm 112 engages the second shoulder 113 of the carry lever 103. With the carry member 105 in this latter position, the operatively connected contactor 117 is connecting the contact insert 121 to the contact insert 122. A carry circuit to the tens order add mechanism is completed through the contactor 117 during the twelfth cycle point of this third machine cycle in a manner to be later explained.

The sensing of the "3" perforation in the tens column of the second record during the third cycle, effects a three tooth advance of the tens order ratchet wheel 63 in the manner previously explained. Thus, the operatively connected contactor 84, which it will be remembered was engaging the "4" insert 94 as a result of the entry of a "4" during the previous cycle, is advanced three more positions until it interconnects the related common insert 93 with the "7" insert 94. This indicates that a seven is now standing in the tens order counter. At the end of the eleventh cycle point of the third cycle, the number 74 is standing in the add device. This number is ten too low since the desired answer is 84. A ten or carry is entered into the tens order add device in the following manner.

During the first part of the twelfth cycle point of the third machine cycle, the previously mentioned cam contact 148 closes momentarily to complete a circuit from the power line 151 through cam contact 148, the normally open side of contacts R164d, now closed as add relay R164 is still being held energized at this time, through the normally closed side of contacts R174c of a relay 174, the conductor 175, the normally closed side of contacts R176i of a relay R176, conductor 177, a spring connector 141 engaging the appropriate contact area 140 (Fig. 9) of the contact plate 18, and a conductive circuit insert 178 on the plate 18 leading to the contact insert 121 of the units order counter. The spring contactor 117 of the units order counter is now in a position to interconnect the contact inserts 121 and 122, and so the above circuit is completed through the conductive circuit insert 179, another spring connector 141 engaging the related contact area 140, a conductor 180, the normally closed side of the contacts R176g, the conductor 181, through the carry coil 48B of the control magnet 48 of the tens order counter to ground. The momentary energization of the magnet 48 effects a single tooth advance of the related ratchet 63 thus advancing its contactor 84 from its "7" to its "8" position. It will be noted in Fig. 10C that if the tens order counter had been standing at "9" rather than "7," the related contactor 95 would have been connecting contact inserts 98 and 99. Thus, the carry pulse in addition to effecting an energization of the control magnet 48 in the tens order position, would have also passed over the contactor 95 of the tens order counter to the coil 48B of the hundreds order control magnet. In this manner, the carry pulse is extended to the higher order counters when required.

At the same time that the tens order ratchet wheel is being advanced to effect carry in the example cited, the units order carry member 105 is reset as previously explained by the reciprocation of the bar 135. Thus, at the end of the third machine cycle, the desired total of 84 is represented in the accumulate device.

Subtraction

Operations with negative numbers are effected in the accumulate devices by the well-known 9's complement method. A negative number is represented in a record in the same true number form as a positive number. However, a negative number card differs from a positive number card in that it contains a sign control perforation in the twelve index point position of its column which is to be sensed by the brush 75B rather than in the column which is sensed by the brush 75A. The brush 75B may be arranged to sense any column other than that sensed by brush 75A.

As a representative subtract operation assume that 37 is to be subtracted from the previously accumulated sum of 84 to give a difference value of +47. To effect this operation, a third record card is provided which is perforated to represent 37 and is also perforated in the 12 index point position of its column which is to be sensed by brush 75B.

During the 12 cycle point of the machine cycle when the third record moves under the brush 75B, a circuit is completed from the power line 151, through the cam contact 143, the normally open side of the contact R152a, now closed, the card lever contact 155, now closed, the common brush 156, the contact roll 76, the brush 75B, a conductor 183 and the pick-up coil of the negative entry control relay R174 to ground. The energization of relay R174 causes its normally open contacts R174a to close, its normally open contacts R174b to close, and its normally closed contacts R174c to open. The closing of the contacts R174a completes a hold circuit for the relay through cam contact 145. Relay R174 is held energized until cam contact 145 opens at the end of the twelfth cycle point of the following machine cycle.

As a result of the closing of the contacts R174b, counter entry pulses from cam contact 146 are directed to each of the control magnets 48 of the accumulate device during the next machine cycle. This circuit extends from the power line 151 through cam contact 146, the normally closed side of contacts R164b, the contacts R174b to the common conductor 185. Each of the control magnets 48 of the counting device is connected to the common conductor 185 through the normally closed "a" contacts of its related entry magnet R168, R172 etc. During the time that the counter entry pulses from contacts 146 are being directed to the control magnets of the counting device, the third record card is being advanced index point by index point past the brushes 77. Upon the sensing of a numeric perforation in a specific column of the record, the related entry magnet R168, R172, etc., is energized in the same manner as previously explained. The resultant opening of the normally closed side of the associated "a" contacts, disconnects the control magnet 48 of that particular order mechanism from the common conductor 185 to prevent the remaining entry pulses from cam contact 146 in that cycle from impulsing that control magnet 48. By examination of Fig. 11, it will be appreciated that this type of operation effects the advance of each ratchet wheel 63 a number of teeth equal to the 9's complement of the number represented in the corresponding column of the record card. Thus, in our particular example, 999962 which is the 9's complement of the card value 37 is entered into the accumulator during the counter entry portion of the second machine cycle. Since the accumulator contained 000084 prior to this operation, the entry of 999962 therein effects the sum 999946 as indicated below:

```
     000084
     999962
     ------
     999946
```

It will be noted that the entry of 6 into the tens order counter advances it through 0 to its 4 position. As the tens order counter advances through zero, the associated "carry" contactor 117 is operated to interconnect associated contact inserts 121 and 122. Also as the hundreds, thousands, ten thousands and hundred thousands order counters advance to their 9 position, the contactors 95 of each of these counters interconnects the associated contact inserts 98 and 99.

With the contactors 117 and 95 in the above described position, the closing of cam contact 148 during the twelfth cycle point of the second machine cycle completes a carry circuit from the power line 151, through cam contact 148, the normally closed side of contacts R164d, the conductor 175, the normally closed side of contacts R176i, conductor 177, a spring connector 141 engaging the appropriate contact area 140 (Fig. 9) of the contact plate 18, the conductive circuit insert 178 on the plate 18 leading to the contact insert 121 of the units order counter, the common circuit insert 139 on the plate 18 (Fig. 8) to the contact insert 121 of the tens order counter, through the associated contactor 117 to the contact insert 122, through the conductive circuit insert 220, another spring connector 141 engaging the related contact area 140, a conductor 221, the normally closed side of the contacts R176f to the carry coil 48b of the control magnet 48 of the thousands order counter. Since the thousands order counter also contains 9, the carry pulse is extended from the contact insert 220 to the thousands order contact insert 99, the thousands order contactor 95, the related contact insert 98, the normally closed side of the contacts R176e to the carry coil 48B of the control magnet 48 of the ten thousands order counter. The tens thousands order counter also contains 9 so the carry pulse is similarly extended to impulse control magnet 48 of the hundred thousands order counter. As the hundred thousand counter itself also contains a 9, the carry pulse is similarly extended therethrough to the related contact insert 98, through a conductive insert 233 of the plate 18, a spring connector 141 engaging the related contact area 140, a conductor 224, the normally closed side of contacts R176i to the carry coil 48B of the control magnet 48 of the units order counter. As a result of the energization of the carry coils 48B of the units, hundreds, thousands, ten thousands, and hundred thousands order counters, a carry (one) is entered in each of the related counters as indicated below. Consequently

```
     999946
     1111 1
     ------
     000047
``` at the end of the carry operation, the accumulator is indicating +47 which is the desired difference value of 84−37.

Counter readout

When desired, the total represented in the accumulate device may be read out to obtain a printed indication. This is effected by depressing a total key 187 indicated in Fig. 10A. With the total key depressed, the closing of the cam contact 143 at the mid-point of the thirteenth machine interval of that machine cycle completes a circuit from the power line 151 through the cam contact 143, the normally open side of the contacts R152a, now closed, conductor 154, the total key contact 187, the conductor 188 and a total relay R189 to ground. The energization of relay R189 causes its normally open contacts R189a to close, its normally open contacts R189b to close, its contacts R189c to transfer, and its contacts R189d to transfer. The closing of the contacts R189a completes a circuit from the power line 151 through cam contact 145, the contacts R189a, and through the hold coil of relay R189 to ground. Relay R189 is held energized through cam contact 145 until the end of the twelfth machine interval of the following machine cycle, which is the actual total cycle.

With the contact R189b closed, timed pulses from cam contact 143 are applied to the common brush 191 (Fig. 10B) of an emitter 192 during the total cycle by a circuit extending from the power line 151 through the cam contact 143, when closed, the contacts R189b, now closed, through the conductor 193 to the common brush 191 of the emitter 192. The emitter 192 contains ten segments 194 each of which is representative of a particular numeral 0 to 9. The common brush 191 is operatively linked to and timed with the power shaft 21 by suitable mechanism (not shown) so that each segment is engaged by the brush 191 from slightly before until slightly after the related interval when the cam contact 143 is closed. This is indicated in Fig. 11. Each segment 194 is connected by a conductor 195 to a related transfer contact R197b to R197k of a so-called balance invert relay R197. With the relay R197 unenergized, a circuit is available from each segment 194 through a conductor 195 and the corresponding normally closed side of the related contacts 197b to k to a related common conductive circuit insert 198—"0" to "9" on the contact plate 18 (Fig. 8). Each insert 198 is in turn connected to the same relative contact insert 94 of each of the six counters of the device, as indicated in Fig. 8 and as previously explained. The common contact insert 93 of each counter of the device is connected by an individual conductor 199 to one terminal of a related electro-magnet 200, the other terminal of the magnet being connected to ground. Each of the magnets 200 controls the setting of an associated print device (not shown). Each print device may comprise a conventional type bar (not shown) similar to that of the H. P. Luhn Patent 2,577,085, the bar having numerals 0 to 9 sequentially arranged thereon. The type bar is operatively linked to the power shaft 21 in any suitable manner and is adapted to move its type elements successively past a printing line in synchronism with the engagement of the brush 191 with successive segments of the emitter 192. By this arrangement, a pulse is applied to each of the print magnets 200 at a differential time in the total cycle as determined by the number represented in that counter. This timed pulse applied to the magnet 200 arrests the related type bar in a well-known way with the desired numeral slug in printing position.

For example, in the previously explained accumulate example a total of 84 resulted from the accumulation of 48 and 36. The "4" in the units order counter is read out as follows. When cam contact 143 closes during the latter portion of the seventh cycle point of the total read out machine cycle, a circuit extends from the power line 151 through cam contact 143, the contacts R189b, now closed, the conductor 193, the common brush 191 of the emitter, the "4" segment 194 of the emitter, the "4" conductor 195, the normally closed side of the contacts R197f, the "4" circuit insert 198 of the contact plate 18 to the "4" contact insert 94 of the units order counter, the associated spring contactor 84, the related common contact insert 93, through the related conductor 199 and the associated print control magnet 200 to ground. The energization of the magnet 200 arrests the movement of the associated print bar with its "4" type slug positioned at the print line. The numeral 8 represented in the tens order counter is read out in a corresponding manner thus arresting its related type bar with the "8" type slug positioned at the print line. Printing is effected at the end of the total cycle, in a well-known manner, by simultaneously forcing the print line positioned type slugs of the type bars against an inked ribbon and a blank backing record.

*Readout conversion of negative numbers*

It will be appreciated that if the total standing in the accumulate device is a negative number, it will be represented therein in complement form rather than true number form. In order to read a complement number out of the accumulate device in true number form, a conversion operation is required. This operation is effected in the following manner. When a total operation is initiated by the depression of the total key 187, the hundreds thousands counter is tested to determine if there is a "9" setting therein. If there is a 9 in this order, which signifies that the number in the accumulate device is a negative number, a conversion is effected. This 9's test operation is effected during the latter part of the cycle preceding the actual total readout cycle. The 9's test circuit extends from the power line 151 through cam contact 144, the normally open side of contacts R189d, now closed as a result of the energization of relay R189 by the depression of the total key, the conductor 202 to the contact insert 98 of the highest order counter, the related contactor 95, which interconnects the contact insert 98 to contact insert 99 when a 9 is standing in that order counter, the related conductor insert 203 on the plate 18, the conductor 204, normally open side of the contacts R189c, now closed, through the conductor 205 and the invert relay R197 to ground. The energization of the relay 197 causes its normally open contacts 197a to close, and its remaining contacts R197b to R197k to transfer. The closing of the contacts 197a completes a circuit from the power line 151 through cam contact 145, contacts R197a and the hold coil of relay R197 to ground. Relay R197 is held energized through cam contact 145 until the end of the twelfth machine interval in the following machine cycle. It will be noted that as a result of the transferring of the contacts R197b to R197k, each of the segments 194 is disconnected from its normal conductor 198 and connected to the conductor 198 representative of the 9's complement of that segment. As a result, the negative number represented in the add device is recomplemented to effect a printing of the total in the device in its true number form.

*Counter reset*

If it is desired to reset the counting device to zero at any time, a reset key 207 is depressed. With the reset key depressed, a circuit is completed at the thirteenth cycle point of the machine cycle from the power line 151 through cam contact 143, the normally open side of contacts R152a which are closed at this time, the reset key contact 207, the conductor 208 and reset relay R176 to ground. The energization of the reset relay R176 causes its normally open contacts R176a to close, its normally open contacts R176b to close, and its contacts R176c to R176i to transfer. The closing of the contacts R176b completes a circuit from the power line 151 through cam contact 145, conductor 169, the contacts R176b, and the hold coil of the reset relay R176 to ground. Relay R176 is held energized through cam contact 145 until the end of the twelfth cycle point of the following cycle. During the following machine cycle, pulses from cam contact 146 are delivered from the power line 151 through cam contact 146, the normally closed side of contacts R164c, the conductor 209 to the contact insert 119 of each of the orders of the counting device. It will be remembered that a contactor 117 normally connects the contact insert 119 with the contact insert 120 at each counter position unless that counter mechanism is registering zero. If a zero is represented in a counter device, the related contactor 117 is displaced by the operation of the carry lever 105 so that it interconnects related contact insert 121 to contact insert 122. With the contactor 117 interconnecting contact insert 119 and insert 120, pulses from cam contact 146 are directed through a related conductor 210, the normally open side of the related contacts R176c to R176h, now closed, through the related conductor 181 and the coil 48B of the related control magnet 48. Each of these pulses from cam contact 146 advance the related counter one position. As the counter advances into its zero position, the carry lever 105 is operated as previously explained to effect the displacement of the related contactor 117 so that it is shifted from engagement with the contact inserts 119 and 120 into engagement with the inserts 121 and 122. This shifting of a contactor 117 prevents any remaining pulses from cam contact 146 reaching the related control magnet. Thus, at the end of the eleventh machine interval of the reset cycle, each accumulate device should be in its zero position.

A test operation is performed during the first part of the twelfth machine interval of the reset cycle to determine if all counters have been reset to their zero position. It will be remembered that if a counter is in its zero position, the associated contactor 95 engages contact inserts 100 and 101 as indicated in Fig. 10C. The contact insert 100 of one order of the device is interconnected to the contact insert 101 of the next higher order of the device as will be evident from an examination of Fig. 10C. Consequently, if the counters are all in their zero position, their related contactors 95 are in effect connected in series. This permits a zero test circuit to be completed during the first half of the twelfth cycle point of the reset cycle. The circuit extends from the power line 151 through the cam contact 149, the normally closed side of contacts R164d, the conductor 175, the normally open side of contacts R179i, still closed at this time, a conductor 212 to the contact insert 101 of the units order counter, the related contactor 95 to the contact insert 100, the series connected tens, hundreds, thousands, ten thousands, and hundred thousands order contactors 95, through the zero test relay R214 to ground. The energization of relay R214 causes its normally open contacts R214a to close, and its normally closed contacts R214b point to open. The closing of the contacts 214a completes a circuit from the power line 151 through cam contact 145, conductor 169, the contacts R214a, the hold coil of the zero test relay R214 to ground. Relay R214 is held energized through cam contact 145 until the end of the twelfth cycle point in which it was energized. With the normally closed contacts R214b open during the twelfth cycle point of the reset cycle, energization of the error relay R216 is prevented thus signifying that all counters are reset to zero.

However, if one of the counters had not been reset to zero, the zero test relay pick up circuit through the six contactors 95 is open. As a result, the zero test relay R214 is not energized. With the zero test relay unenergized during the twelfth machine interval of the reset cycle, a circuit is available during the latter part of the twelfth machine interval from the power line 151 through cam contact 142, now closed, a conductor 217, the normally open contacts R176a still closed at this time, the normally closed R214b contacts and the error relay R216 to ground. The energization of error relay R216 causes its normally open contacts R216a to close and its normally open contacts R216b to close. The closing of the contacts R216b completes a circuit from the power line 151 through the contacts 216b and an error light 218 to ground. The closing of the contacts R216a completes a circuit from the power line 151 through a normally closed error reset contact 219, the contacts 216a and the hold coil of R216 to ground. The error relay is held energized and the error light remains energized until the hold circuit of the error relay is broken by a depression of the error reset key 219.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An accumulating unit comprising in combination, a ratchet accumulator wheel, a spring biased pivoted lever, a pawl pivoted to said lever and adapted to engage said ratchet wheel, a continuously reciprocating member having a pin projecting laterally therefrom into the plane of said lever, means to latch said lever in a position free of the reciprocation path of said pin, and means to release said latch device thus permitting the lever to engage and follow said pin for one reciprocation to effect a single tooth displacement of said ratchet wheel.

2. An accumulating device comprising, in combination, a plurality of denominationally ordered ratchet wheels each being adapted to be advanced into any of a plurality of rotative positions to represent different amounts, a continuously reciprocating driving member extending adjacent all of said ratchet wheels, a pin projecting from said driving member near each of said wheels, a spring biased lever for each of said denominational orders, said lever having an extending arm projecting into the plane of the related pin of said driving member, a pawl pivoted on each of said levers and adapted for cooperation with the related ratchet wheel, means normally latching each of said levers in a position with said arm clear of the reciprocating path of said related pin, and means to release each of said latches thus permitting said related lever to engage and follow the reciprocating movement of the related pin for one cycle to effect a single tooth advance of the related ratchet wheel.

3. A plural order accumulating device comprising, in combination, a plurality of denominationally ordered accumulating wheels each having ten possible digit representing positions, a continuously reciprocating driving member extending adjacent all of said accumulating wheels, a pin projecting outwardly from said driving member near each of said wheels, a spring biased lever for each of said wheels, said lever having an extending portion projecting into the plane of the related pin of said driving member, a driving pawl pivoted on each of said levers and adapted to operatively engage the related accumulating wheel, means normally latching each of said levers in a position with its said arm clear of the reciprocating path of said related pin, and an electro-magnet to release each of said latches thus permitting said related lever to engage and follow the reciprocating movement of the related pin for one cycle to effect a single unit advance of the related accumulating wheel.

4. An accumulating device comprising, in combination, a counting wheel, a continuously reciprocating driving member, a coupling device interposed between said driving member and said counting wheel, means normally latching said coupling member in an inoperative position to maintain said wheel disconnected from said driving member, a magnet for releasing said latching means, a source of equally spaced impulses, and record controlled means for selectively directing one or more of said impulses to said magnet, each of said impulses rendering said coupling means effective for one reciprocation of said driving member to advance said counting wheel a unit amount.

5. An accumulator unit comprising, in combination, a plurality of denominationally ordered accumulating wheels each being adapted to be advanced to any of a plurality of rotative positions, a continuously reciprocating driving member, a coupling means interposed between each of said wheels and said driving member, means normally latching each of said coupling members in an inoperative position with said related wheel disconnected from said driving member, means for tripping said latching means wherein said coupling member is rendered effective for one reciprocation of said driving member resulting in the related wheel being advanced to its successive rotative position, and transferring means actuated by each of said wheels as it is rotated through a predetermined rotative position and adapted for tripping the latching means of the successive higher order accumulating wheel.

6. A decimal accumulator comprising, in combination, a plurality of denominationally ordered counting wheels adapted to be rotated into any one of ten rotative positions, each position having distinctive decimal significance, a continuously reciprocating driving member, coupling means interposed between each of said counting wheels and said driving member, said coupling devices being normally inoperative, electrically controlled means including a magnet for rendering any of said coupling means effective for one reciprocation of the driving member wherein the related counting wheel is advanced to the next succeeding decimally significant position, a cam mounted on each of said wheels, a lever operated by each cam and assuming a first position when the wheel is at any position representative of the decimal values 1 to 09, and temporarily assuming a second position when the wheel passes from 9 to 0; and circuit means including contacts closed by said lever when in said second position for energizing the electrical control means of the succeeding counter.

7. In an accumulating unit having an accumulating wheel which is to be advanced to any of a plurality of rotative positions to represent different amounts, including in combination, a continuously reciprocating driving member, coupling means interposed between said driving member and said wheel, said coupling means being normally in an inoperative condition with said wheel accordingly disconnected from said driving means; an impulse responsive device for rendering said coupling means operative for one reciprocation of said driving means for each impulse received wherein said wheel is accordingly advanced to the succeeding rotative position, a source of equally spaced electrical impulses, and record controlled means for selectively directing one or more of said impulses to said impulses responsive device to effect advance of said wheel in accordance with the number of pulses selected.

8. The mechanism of claim 1, further characterized by means for electrically indicating the rotative position of said wheel, said means comprising a plate of insulating material having conductive contact inserts therein on each side thereof, said contact inserts being arranged in a circular fashion around an opening through said sheet; an insulating bushing operatively linked to said wheel for rotation therewith but free for movement in an axial direction relative to said wheel, said bushing extending through said opening in said plate; a first spring contactor secured to the outer end of said bushing and adapted to bear against the outer surface of said plate to interconnect particular diametrically opposite contact inserts thereon as determined by the rotative position of said wheel; and a second contactor secured to the inner end of said bushing and adapted to bear against the inner surface of said plate to interconnect diametrically opposite contact inserts thereon as determined by the rotative position of said wheel; wherein said bushing by its freedom of movement in an axial direction relative to said wheel permits said first and second contactors to continuously adjust themselves to irregularities in wear of the plate, contact inserts, and the contactors and thus positively maintain electrical contact with said contact inserts.

9. In an accumulating unit having a plurality of denominationally ordered accumulating wheels each of which is adapted to be rotated into any of ten decimally representative rotative positions to represent various amounts, including in combination, a continuously reciprocating driving member, individual coupling devices interposed between each of said wheels and said driving member, said coupling means being normally in an inoperative condition with said related wheel accordingly disconnected from said driving means, and impulse responsive device for rendering said coupling means operative for one reciprocation of said driving means for each impulse received, wherein said wheel is accordingly advanced to the succeeding rotative position; means for reading a succession of records for designations representing amounts, means for reading said records for control designations representing the algebraic signs of the related amounts prior to the reading of the amounts, a source of electrical impulses, counter entry means for directing said impulses to any or all of said impulse responsive devices in accordance with the amounts read by said first reading means, and means associated with said counter entry means for causing said impulses to be entered additively into said accumulator as determined by the prior reading of a positive algebraic designation in that record by said second reading means, and for causing said impulses to be entered subtractively in 9's complement form as determined by the prior reading of a negative designation in that record by said second reading means.

10. An accumulating device comprising, in combination, a plurality of denominationally ordered accumulating wheels adapted to be rotated into any one of ten decimal manifesting positions, continuously reciprocating driving means common to all of said wheels, impulse responsive means interposed between each of said wheels and said driving member for connecting said related wheel to said driving member for one reciprocation of the latter for each impulse received, each reciprocation of the driving member when so connected advancing the related wheel to manifest the next succeeding digit, means for creating a succession of ten impulses, record controlled means for selectively directing one or more of the first nine of said impulses to said impulse responsive devices to effect advance of the associated wheel in accordance with the number of impulses selected, individual carry devices associated with each wheel and rendered operative when said wheel advances into its 0 position for later directing the tenth impulse to the succeeding order impulse device to effect tens carry, and means common to all of said counter orders for restoring said carry devices to an inoperative position after carry time.

11. An accumulating device comprising, in combination, a plurality of denominationally ordered accumulating elements adapted to be displaced into any one of ten decimal manifesting positions, a continuously reciprocating driver common to all of said elements, impulse responsive devices interposed between each of said elements and said driver for connecting said related element to said driver for a single reciprocation of the latter for each impulse received, each reciprocation of the driver when so connected displacing the related element to a position representative of the succeeding digit, means for creating a succession of ten impulses, record controlled means for selectively directing one or more of the first nine of said impulses to said impulse responsive device to effect displacement of the associated element in accordance with the number of impulses selected, individual carry devices associated with each of said element for directing said tenth impulse to the succeeding element when required to effect 10's carry, resetting means for directing said impulses to each of said elements when reset is required, and means associated with each of said elements and rendered effective as it reaches it 0 position for preventing further application of said impulses to that element during reset operations.

References Cited in the file of this patent

UNITED STATES PATENTS

| Number | Name | Date |
|--------|------|------|
| 2,480,744 | Lake et al. | Aug. 30, 1949 |